| (12) | United States Patent | (10) Patent No.: | US 10,759,309 B2 |
|---|---|---|---|
| | Flick et al. | (45) Date of Patent: | Sep. 1, 2020 |

(54) LONGITUDINAL ADJUSTER AND VEHICLE SEAT

(71) Applicant: ADIENT LUXEMBOURG HOLDING S.À R.L., Luxembourg (LU)

(72) Inventors: Joachim Flick, Hueckeswagen (DE); Erik Sprenger, Wermelskirchen (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 0 days.

(21) Appl. No.: 16/315,000

(22) PCT Filed: Jun. 29, 2017

(86) PCT No.: PCT/EP2017/066126
§ 371 (c)(1),
(2) Date: Jan. 3, 2019

(87) PCT Pub. No.: WO2018/007233
PCT Pub. Date: Jan. 11, 2018

(65) Prior Publication Data
US 2019/0184859 A1    Jun. 20, 2019

(30) Foreign Application Priority Data
Jul. 4, 2016   (DE) .................. 10 2016 212 168

(51) Int. Cl.
*B60N 2/08*    (2006.01)
*B60N 2/07*    (2006.01)

(52) U.S. Cl.
CPC ......... *B60N 2/0875* (2013.01); *B60N 2/0705* (2013.01); *B60N 2/0806* (2013.01); *B60N 2/0818* (2013.01); *B60N 2205/20* (2013.01)

(58) Field of Classification Search
CPC .. B60N 2/0875; B60N 2/0705; B60N 2/0806; B60N 2/0818; B60N 2205/20
See application file for complete search history.

(56) References Cited

U.S. PATENT DOCUMENTS

| 5,961,193 A | 10/1999 | Hobbs |
|---|---|---|
| 6,109,584 A | 8/2000 | Garrido |

(Continued)

FOREIGN PATENT DOCUMENTS

| DE | 199 11 281 A1 | 9/2000 |
|---|---|---|
| DE | 10 2010 049 542 A1 | 4/2012 |

(Continued)

*Primary Examiner* — Anita M King
(74) *Attorney, Agent, or Firm* — Marshall & Melhorn, LLC (57) ABSTRACT

A longitudinal adjuster (10), for a vehicle seat (1), includes at least one pair of rails (12), formed from a lower seat rail (14a) and an upper seat rail (14b). The seat rails mutually engage around each other and are movable relative to each other in a longitudinal direction (x) and are lockable to each other by a locking device (16). The locking device has at least one latching plate (18), which is movable in the vertical direction (z). The latching plate has a guide pin (20) protruding in the vertical direction. The upper seat rail has an opening (22) aligned with the guide pin. A guide sleeve (24) extends into a cavity between the seat rails and is accommodated in the opening. The guide pin is guided by the guide sleeve. The upper seat rail and the guide sleeve are connectable by a bayonet catch.

17 Claims, 7 Drawing Sheets

(56) References Cited

U.S. PATENT DOCUMENTS

| | | | |
|---|---|---|---|
| 6,637,712 B1 | 10/2003 | Lagerweij | |
| 2009/0289485 A1* | 11/2009 | Walter | B60N 2/0705 |
| | | | 297/344.1 |
| 2013/0264453 A1 | 10/2013 | Dill et al. | |
| 2016/0102702 A1* | 4/2016 | Lang | E05D 11/1078 |
| | | | 248/479 |
| 2017/0305305 A1* | 10/2017 | Flick | B60N 2/0705 |
| 2018/0229626 A1 | 8/2018 | Sprenger et al. | |

FOREIGN PATENT DOCUMENTS

| | | |
|---|---|---|
| DE | 10 2011 100 762 A1 | 11/2012 |
| DE | 10 2014 219 868 A1 | 3/2016 |
| EP | 2 630 003 B1 | 8/2016 |
| KR | 101 330 025 B1 | 11/2013 |

\* cited by examiner

LONGITUDINAL ADJUSTER AND VEHICLE SEAT

CROSS REFERENCE TO RELATED APPLICATIONS

This application is a United States National Phase Application of International Application PCT/EP2017/066126 filed Jun. 29, 2017, and claims the benefit of priority under 35 U.S.C. § 119 of German Application 10 2016 212 168.5, filed Jul. 4, 2016, the entire contents of which are incorporated herein by reference.

TECHNICAL FIELD

The invention relates to a longitudinal adjuster, for a vehicle seat, having at least one pair of rails which is formed from a lower seat rail and an upper seat rail, wherein the seat rails of the pair of seat rails mutually engage around each other and are movable relative to each other in a longitudinal direction (x) and are lockable to each other by a locking device. The invention further relates a vehicle seat with such a longitudinal adjuster.

BACKGROUND

A longitudinal adjuster of a vehicle seat is disclosed in DE 10 2014 219 868 A1, comprising at least one seat rail which is fixed to the vehicle and one seat rail which is fixed to the seat which mutually engage around each other, forming a pair of rails, and which are movable relative to one another in the longitudinal direction, wherein the pair of rails is lockable by means of a rail lock, further comprising at least one actuating arrangement for actuating the rail lock. The rail lock has a latching plate with a guide pin which is continuously guided in a through-opening of the seat rail which is fixed to the seat.

A longitudinal adjuster for a vehicle seat is disclosed in DE 10 2011 100 762 A1, comprising a pair of seat rails with a first seat rail which is fixed to the structure, a second seat rail which is guided in this first seat rail in the longitudinal direction of the seat and which is connected to the vehicle seat, and a releasable locking device having at least two latching plates which are movable in a locking direction for the releasable locking of the position of the first seat rail relative to the second seat rail, wherein an actuating element is provided, said actuating element being arranged inside the second seat rail and cooperating with the latching plates for unlocking the longitudinal adjuster, wherein the actuating element is displaceable via an actuating pin which is movably guided in the z-direction and which is guided through the second seat rail.

A longitudinal adjuster for a vehicle seat is disclosed in EP 2 630 003 B1, comprising a first seat rail and a second seat rail which mutually engage around each other, forming a rail profile, and which are movable relative to one another in the longitudinal direction, and a rail lock which locks together the seat rails and which is arranged at least substantially inside the rail profile formed by the seat rails, wherein an actuating arrangement is provided for actuating an unlocking unit, wherein the unlocking unit is arranged at least substantially inside the rail profile formed by the seat rails.

A telescoping-sliding arrangement for the slidable bearing of a load is disclosed in U.S. Pat. No. 5,961,193 A. The telescoping-sliding arrangement comprises intermediate sliding elements which are connected together and which receive the load and stationary sliding elements which are movable relative to one another.

SUMMARY OF THE INVENTION

An object of the invention is to improve a longitudinal adjuster of the type mentioned in the introduction, in particular to prevent inadvertent unlocking of a latching plate of a locking device and/or to permit a reduction in contact noise and to provide a corresponding vehicle seat.

This object is achieved according to the invention by a longitudinal adjuster for a vehicle seat, having at least one pair of rails which is formed from a lower seat rail, in particular a seat rail which is fixed to the vehicle, and an upper seat rail, in particular a seat rail which is fixed to the seat, wherein the seat rails of the pair of seat rails mutually engage around each other and are movable relative to each other in the longitudinal direction and are lockable to each other by means of a locking device, wherein the locking device has at least one latching plate which is movable in the vertical direction, wherein the latching plate has a guide pin protruding in the vertical direction, wherein the upper seat rail has an opening aligned with the guide pin, wherein a guide sleeve extending into the cavity formed between the seat rails is accommodated in the opening and the guide pin is guided by means of the guide sleeve, wherein the guide sleeve and the upper seat rail are connectable by means of a bayonet catch.

As a guide sleeve extending in the cavity formed between the seat rails is received in the opening of the upper seat rail and the guide pin is guided by means of the guide sleeve, a direct contact between the conventionally metal guide pin and the metal upper rail may be avoided.

As the guide sleeve and the upper seat rail are able to be connected by means of a bayonet catch, the guide sleeve may be premounted in a simple manner when mounting the longitudinal adjuster. "Bayonet catch" within the meaning of the present invention is generally denoted as a connection which is implemented by a plug-in rotational movement. Accordingly, for fastening in the upper rail the guide sleeve is initially inserted in an insertion direction and subsequently secured by a rotational movement in the upper rail against further removal from the upper rail counter to the insertion direction. This may be implemented, for example, by a portion of the bayonet catch inserted into the upper rail engaging partially behind the upper rail after the rotational movement.

It may be provided that the guide sleeve is designed to be closed upwardly in the vertical direction. As a result, an inadvertent actuation of the guide pin by means of a force acting from above onto the guide pin may be prevented. Moreover, the penetration of dirt and dust is prevented so that the guide pin is also prevented from being blocked.

Moreover, the guide sleeve may bear by means of a top portion in the region of the opening from above against a surface of the upper seat rail and as a result may be retained on an edge region of the opening. As a result, a force acting from above onto the guide sleeve is directly introduced into the upper seat rail and a transmission of the force onto the guide pin is avoided. By means of the top portion, the guide sleeve may be configured to be stepped in the vertical direction.

The guide sleeve may have an upwardly rounded outer surface. In particular, by avoiding sharp edges, possible injuries to personnel may be prevented during mounting or subsequent use of the longitudinal adjuster.

For simpler reception of the guide pin, the guide sleeve may also have a conical opening in a lower region, in particular with a downwardly open angle. Due to the conical opening of the guide sleeve, the guide pin is permitted a small degree of play which may be present due to an uneven engagement of the latching plate in a toothed portion of the lower seat rail, and thus a reliable function of the locking device is ensured.

In addition to the bayonet catch, the guide sleeve may have an anti-twist protection device which fixes the mounted guide sleeve in the opening. The guide sleeve may have a stop. A contour of the opening may have a stop edge. The stop edge may be arranged in a lateral widening of the opening, in particular a widening which outwardly widens a partially round opening cross-section. Preferably, the guide sleeve is designed such that after the mounting of the latching plate the guide sleeve may be inserted with the guide pin from above into the opening of the upper seat rail and by a rotation about a vertical axis is able to be blocked captively.

The anti-twist protection device may be configured in the form of a clip protruding in a spring-elastic manner. Alternatively, the anti-twist protection device may be configured in the form of securing pins which are movably arranged in the vertical direction in the guide sleeve. If the guide sleeve inserted into the opening is rotated to such an extent that the stop and the stop edge bear against one another, by a displacement of the securing pins, in particular by pushing the securing pins into the guide sleeve, the guide sleeve may be secured against rotation. In this case, the securing pins with their lower end enter the contour of the opening and secure the contact of the stop relative to the stop edge.

Moreover, an internal diameter of the guide sleeve may be slightly larger than an external diameter of the guide pin. This permits a greater mobility of the guide pin parallel to the vertical direction.

Alternatively or additionally, the guide sleeve may have at least three guide surfaces on its inner face, in particular on the inner face of a guide opening. As a result, the contact surface may be reduced between the inner face of the guide opening of the guide sleeve and the guide pin, so that friction between the guide sleeve and the guide pin is also reduced. Moreover, a defined contact surface is produced between the inner face of the guide opening of the guide sleeve and the guide pin.

The guide sleeve may be produced from a plastics material, in particular by means of a plastics injection-molding method. As a result of a production of the guide sleeve from plastics material, disruptive contact noise, by the metal guide pin bearing or rubbing against the metal upper rail, may be avoided.

The object is further achieved by a vehicle seat having a longitudinal adjuster according to the above description. As a result, the vehicle seat according to the invention has the same advantages as the embodiments of the longitudinal adjuster described above.

The invention is described in more detail hereinafter with reference to advantageous exemplary embodiments shown in the figures. However, the invention is not limited to these exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
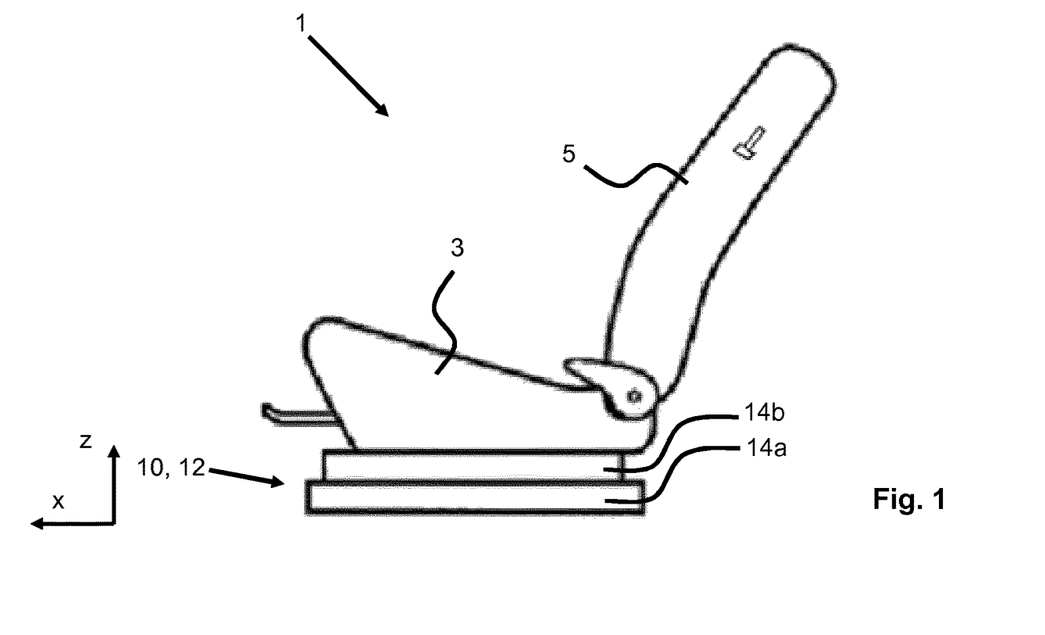
FIG. 1 is a schematic view of a vehicle seat with a longitudinal adjuster according to the invention.

Referring to the drawings, a vehicle seat 1 shown schematically in FIG. 1 is described hereinafter by using three spatial directions extending perpendicular to one another. In the case of a vehicle seat 1 installed in the vehicle, a longitudinal direction x extends substantially horizontally and preferably parallel to a vehicle longitudinal direction which corresponds to the usual direction of travel of the vehicle. A transverse direction y extending perpendicular to the longitudinal direction x is also oriented horizontally in the vehicle and extends parallel to a vehicle transverse direction. A vertical direction z extends perpendicular to the longitudinal direction x and perpendicular to the transverse direction y. In the case of a vehicle seat 1 installed in the vehicle, the vertical direction z extends parallel to the vehicle vertical axis.

The positional and directional information used, such as for example front, rear, above and below refer to a viewing direction of an occupant seated in the vehicle seat 1 in the normal seating position, wherein the vehicle seat 1 is installed in the vehicle in a position of use which is suitable for conveying passengers, with the backrest 5 located upright, and is oriented in the conventional manner in the direction of travel. The vehicle seat 1 according to the invention, however, may also be installed in a different orientation, for example transversely to the direction of travel.

The vehicle seat 1 for a motor vehicle shown in FIG. 1 has a seat part 3 and a backrest 5 which is adjustable in its inclination relative to the seat part 3. An inclination of the backrest 5 may, for example, be adjustable by means of a latching fitting or a geared fitting. The vehicle seat 1 is mounted on a longitudinal adjuster 10 for the adjustment of a seat longitudinal position.

Figure 2:
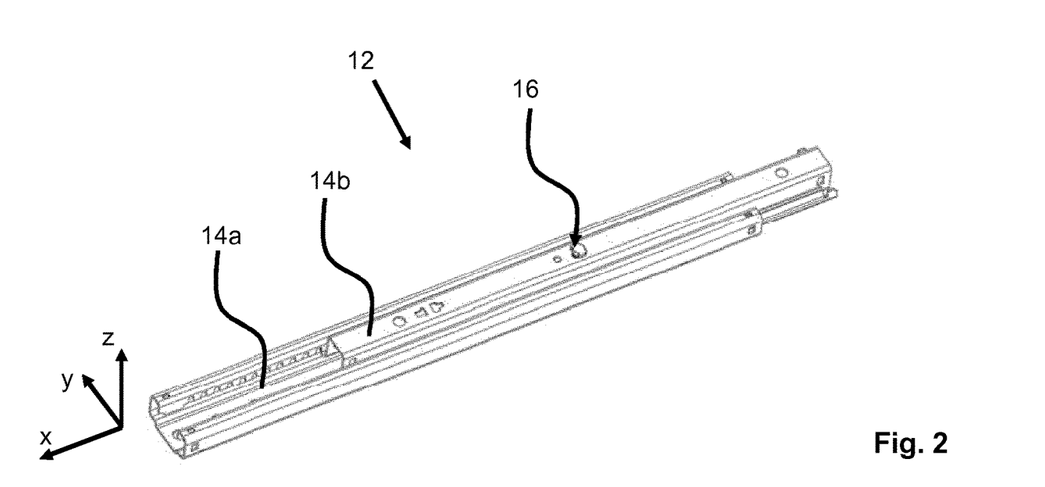
FIG. 2 is a schematic view of a pair of rails of the longitudinal adjuster according to the invention according to a first exemplary embodiment.

FIG. 2 shows a schematic view of a pair of rails 12 of the longitudinal adjuster 10. The pair of rails 12 is formed from a lower seat rail 14a, hereinafter also denoted synonymously as the lower rail, and an upper seat rail 14b, hereinafter also denoted synonymously as the upper rail. A locking device 16 is arranged in a cavity formed between the lower rail 14a and the upper rail 14b.

Figure 3:
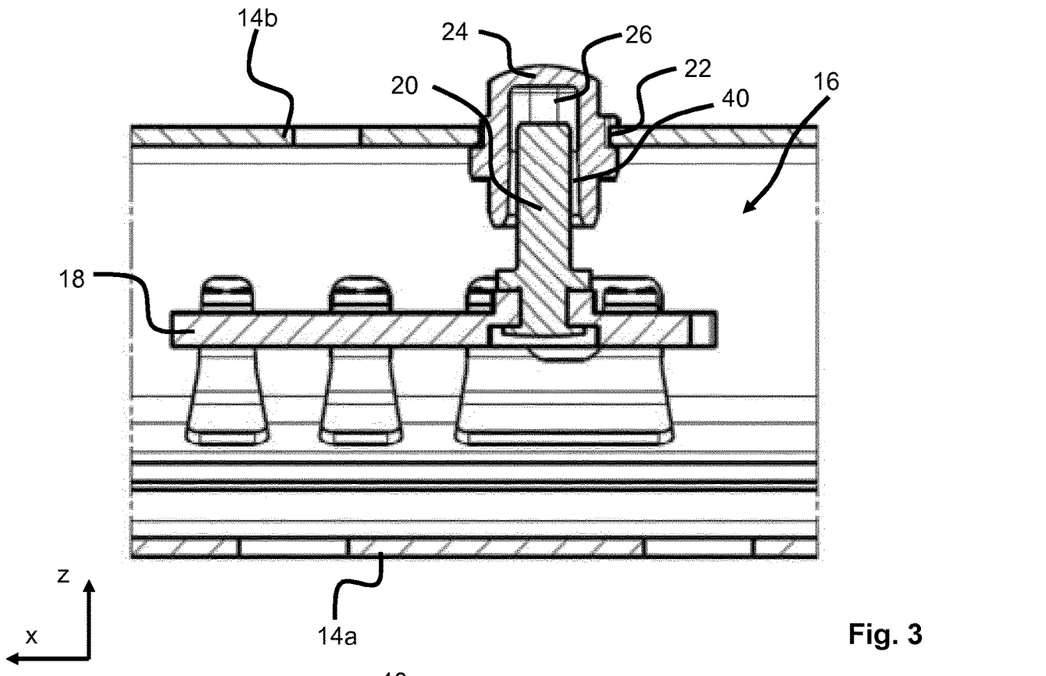
FIG. 3 is a detailed longitudinal sectional view through a locking device of the pair of rails of FIG. 2 in a locked state.
Figure 4:
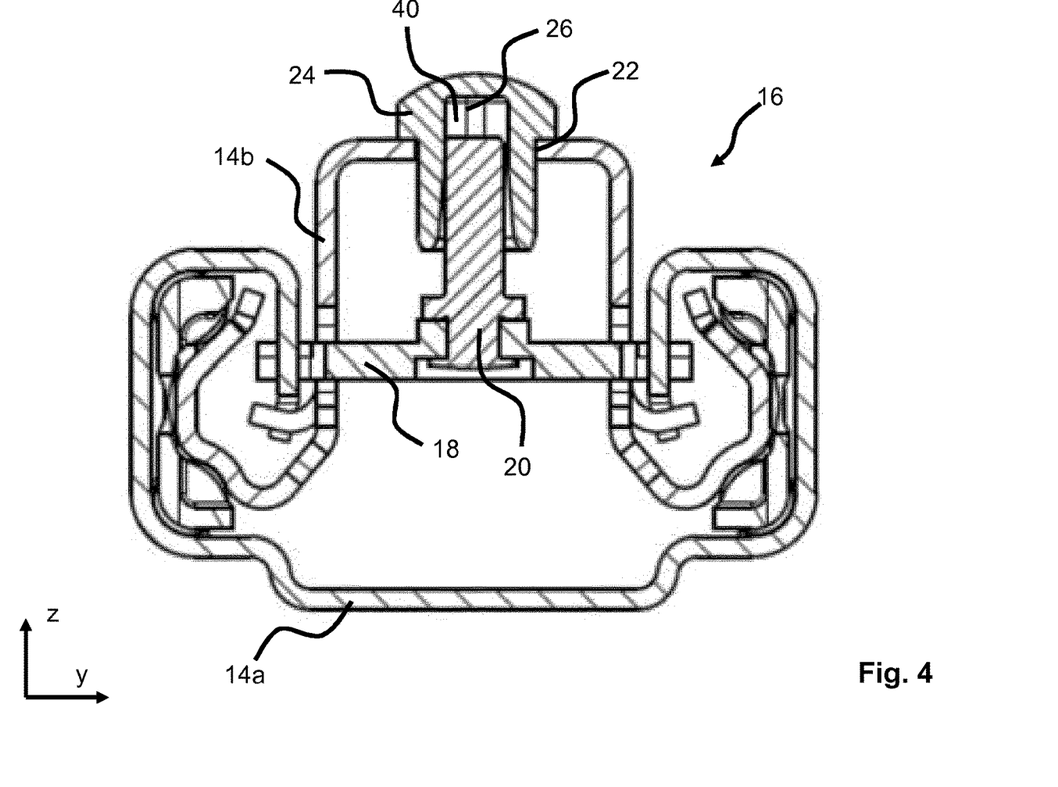
FIG. 4 is a cross-sectional view through the locking device of FIG. 3 in a locked state.
Figure 5:
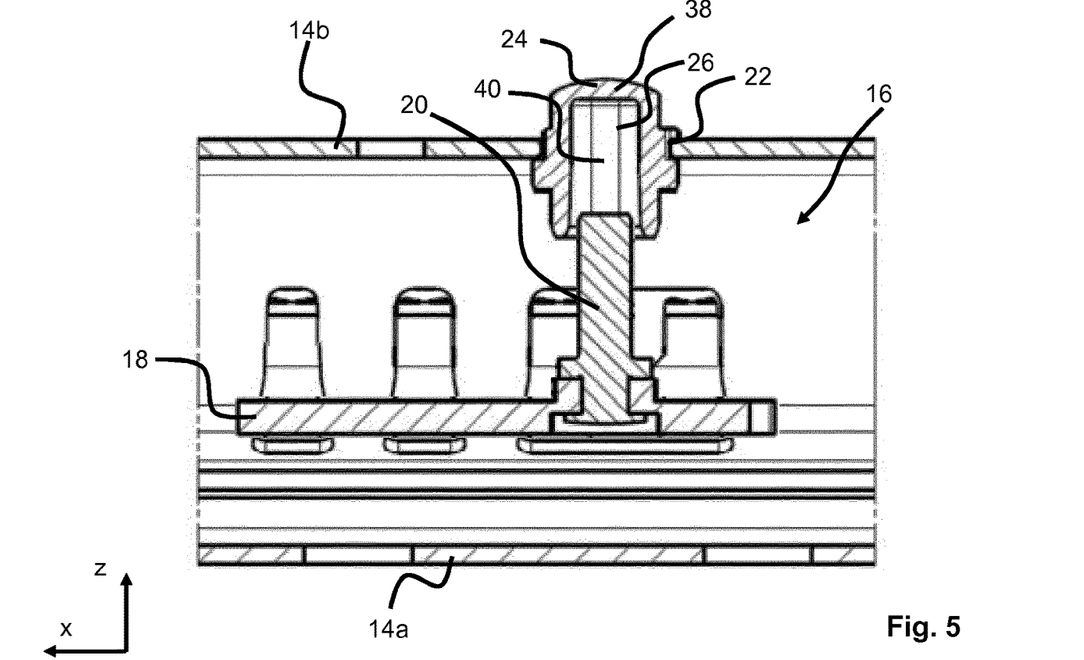
FIG. 5 is a detailed longitudinal sectional view through the locking device of the pair of rails of FIG. 2 in an unlocked state.
Figure 6:
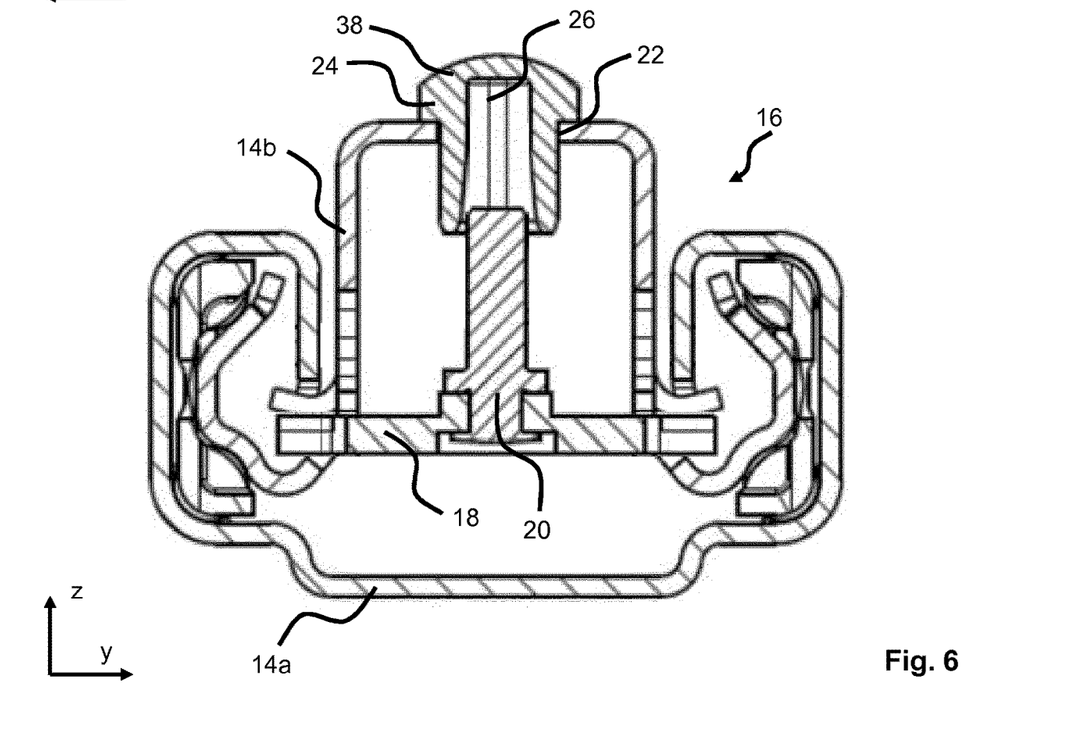
FIG. 6 is a cross-sectional view through the locking device of FIG. 5 in an unlocked state.

FIGS. 3 and 5 show a detailed longitudinal section through the locking device 16 of the pair of rails 12 of FIG. 2, in each case in a locked state and in an unlocked state. FIGS. 4 and 6 in each case show a cross-section through the locking device 16 corresponding to FIGS. 3 and 5, in corresponding locked states. FIGS. 3 to 6 are described hereinafter together.

In principle, a construction and a function of devices for actuating the locking device 16, in particular, for moving the latching plate 18 into an unlocked position or a locked position, is known. If, for example, reference is made to DE 10 2010 049 542 A1 and corresponding US publication US 2013/264453 A1 and DE 10 2014 219 868 A1 and corresponding US publication US 2018/229626 A1, the relevant disclosure thereof is expressly incorporated herein. Moreover, in a similarly known manner, a spring element, not shown, driving the latching plate 18 into the locked position, may be arranged between the latching plate 18 and the upper rail 14b, said spring element subjecting the latching plate 18 to a spring force counter to an unlocking direction.

A guide pin 20 is arranged so as to protrude in the vertical direction z from the latching plate 18. The guide pin 20 is fixedly connected to the latching plate 18, preferably riveted thereto. The guide pin 20 has at least such a length that the guide pin 20 is held in a lower region of a guide sleeve 24 mounted in the upper rail 14b, when the latching plate 18 is in the unlocked state. Similarly, the guide sleeve 24, in particular a guide opening 40 in the guide sleeve 24 designed substantially partially cylindrically or partially conically, has at least such a depth that the guide pin 20 is able to enter the guide opening 40 of the guide sleeve 24 unhindered, at least until the latching plate 18 is brought into the locked position.

The guide sleeve 24 bears from above with an upper top portion 38 against a surface of the upper rail 14b. The guide sleeve 24, in particular the guide opening 40 of the guide sleeve 24, is closed upwardly. The guide sleeve 24 has a rounded top portion 38, in particular a top portion 38 with a peripheral rounded edge. Guide surfaces 26 which serve to guide the guide pin 20 are also arranged on an inner wall of the guide opening 40 of the guide sleeve 14.

Figure 7:
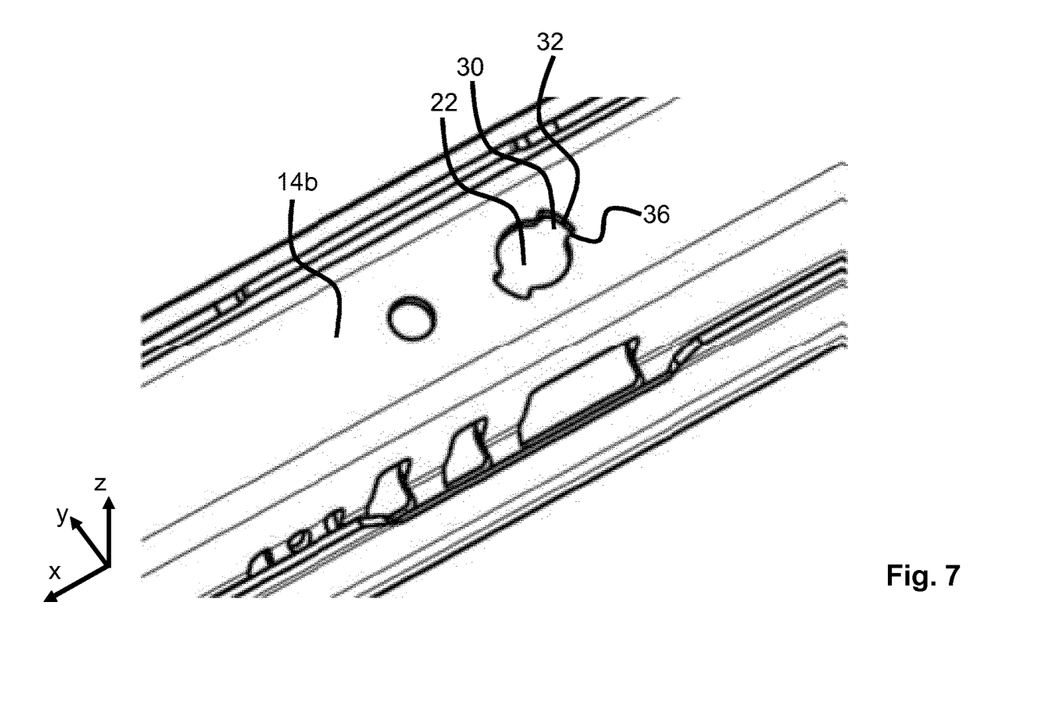
FIG. 7 is a detailed view of an upper seat rail of the longitudinal adjuster according to the first exemplary embodiment.

FIG. 7 shows a detailed view of an upper rail 14b of the longitudinal adjuster 10. The upper rail 14b has an opening 22. The opening 22 serves for receiving the guide sleeve 24.

Figure 8:
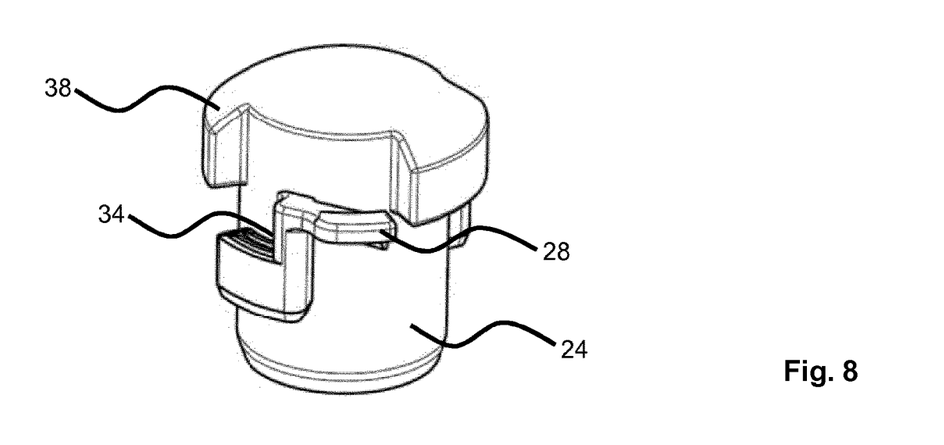
FIG. 8 is a perspective view of a guide sleeve according to the first exemplary embodiment.

FIG. 8 shows a perspective view of a possible design of the guide sleeve 24, which is adapted to the design of the opening 22 of FIG. 7. The guide sleeve 24 in the present case has an anti-twist protection device 28 in the form of a clip protruding in a spring-elastic manner which, when the guide sleeve 24 inserted into the opening 22 is rotated, engages in the opening 22 and after mounting has been carried out is supported, counter to a predetermined rotational direction for mounting, on an edge portion of the opening 22, in particular on an edge portion of a contour 32 of a lateral widening 30 of the opening 22. The guide sleeve 24 has in the present case a stop 34 which defines a rotatability of the guide sleeve 24 inserted in the opening 22, when the stop 34 comes to bear against a corresponding stop edge 36 of the opening 22.

If the individual parts of the second exemplary embodiment described hereinafter have the same reference numerals as in the first exemplary embodiment described above, these are identical to the parts of the first exemplary embodiment. Differently described parts have a reference numeral increased by one hundred and, unless explicitly described, may still partially coincide in terms of design and function with the parts of the first exemplary embodiment.

Figure 9:
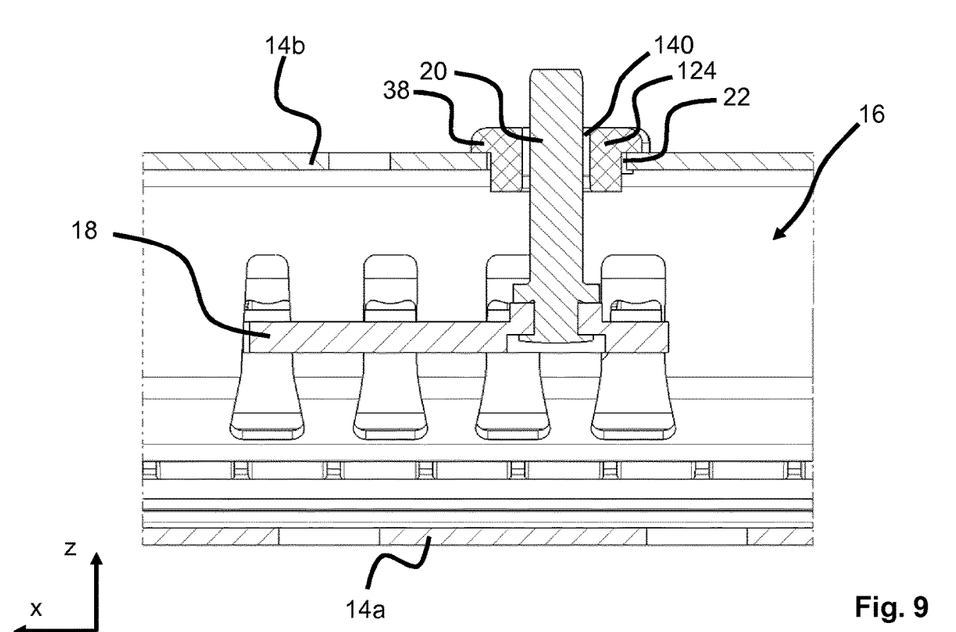
FIG. 9 is a detailed longitudinal sectional view through a locking device of a pair of rails according to a second exemplary embodiment in a locked state.

The locking device 16 shown in FIG. 9 with a guide sleeve 124 according to a second exemplary embodiment corresponds substantially to the locking device 16 of the first exemplary embodiment. The only difference from the locking device 16 of the first exemplary embodiment is that the guide sleeve 124 according to the second exemplary embodiment has a guide opening 140 in the form of a through-opening which in the locked state permits the guide pin 20 to protrude upwardly out of the guide opening 140. The guide sleeve 124 is secured in the opening 22 of the upper rail 14b by means of the bayonet catch.

If individual parts of the third exemplary embodiment described hereinafter have the same reference numerals as in the first exemplary embodiment described above, these are identical to the parts of the first exemplary embodiment. Differently described parts have a reference numeral increased by two hundred and, unless explicitly described, may still partially coincide in terms of design and function.

Figure 10:
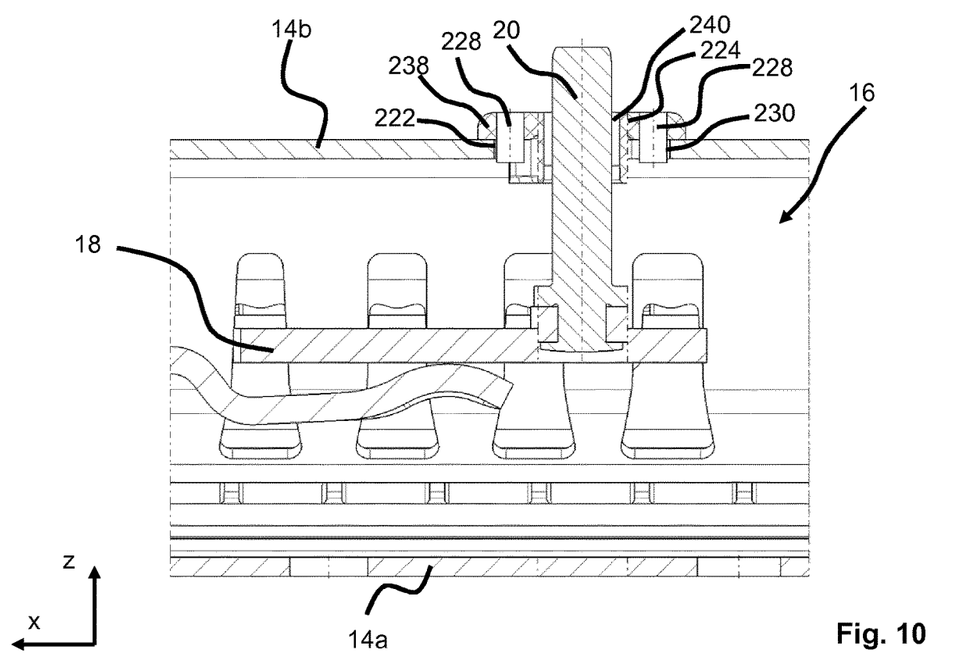
FIG. 10 is a detailed longitudinal sectional view through a locking device of a pair of rails according to a third exemplary embodiment in a locked state.

FIG. 10 shows a locking device 16 of a pair of rails 12 with a guide sleeve 224 according to a third exemplary embodiment in a locked state. The guide pin 20 protrudes from the latching plate 18 in the vertical direction z. The guide pin 20 is fixedly connected to the latching plate 18. The guide pin 20 has at least such a length that the guide pin 20 is held in a guide sleeve 224 mounted in the upper rail 14b when the latching plate 18 is located in the unlocked position. Similarly, the guide sleeve 224 has the substantially partially cylindrical or partially conically designed guide opening 240 in the form of a through-opening, so that the guide pin 20 may be guided unhindered in the guide opening 240 of the guide sleeve 224. Moreover, it is shown that the guide sleeve 224 bears from above with an upper top portion 238 against a surface of the upper rail 14b. The guide sleeve 224 has a rounded top portion 238, in particular a top portion 238 with a peripheral rounded edge.

The anti-twist protection device 228 is configured in the form of securing pins which are movably arranged in the vertical direction z in the top portion 238 of the guide sleeve 224. In a secured state of the guide sleeve 224 in the opening 222 of the upper rail 14b, the securing pins of the anti-twist protection device 228 protrude downwardly out of the top portion 238 of the guide sleeve 224 and into the opening 222. The opening 222 has an adapted contour 232 for receiving the guide sleeve 224.

Figure 11:
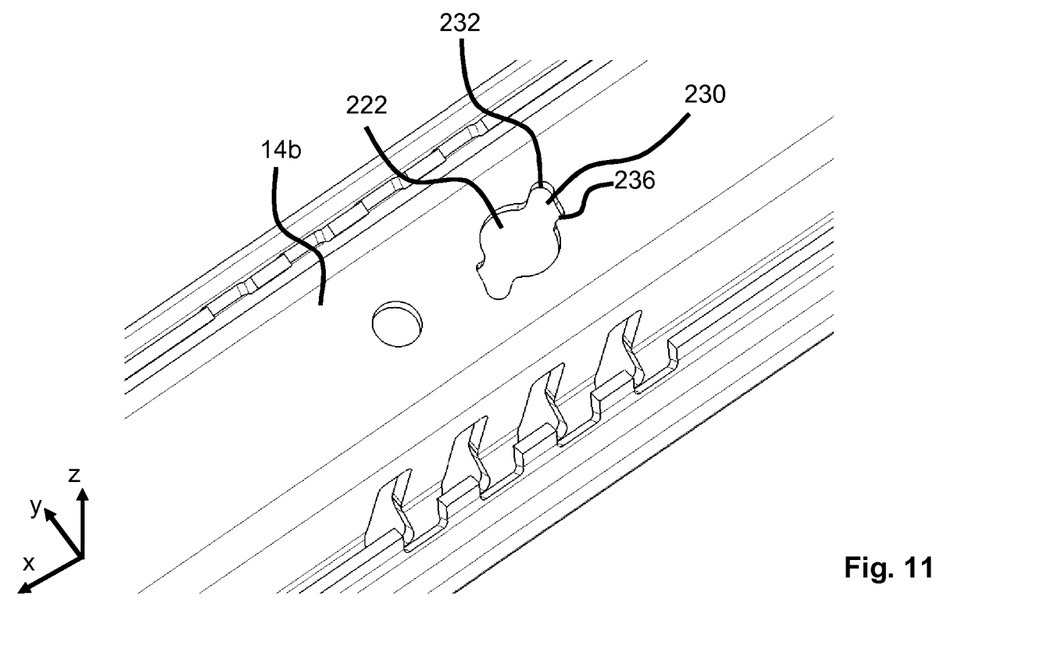
FIG. 11 is a detailed view of an upper seat rail of the longitudinal adjuster according to the third exemplary embodiment.

The contour 232 of the opening 222 is shown in detail in FIG. 11. The opening 222 has at least one, but in the present case two, lateral widenings 230 which outwardly widen a partially round opening cross-section. In each case, the two widenings have in turn a stop edge 236.

Figure 12:
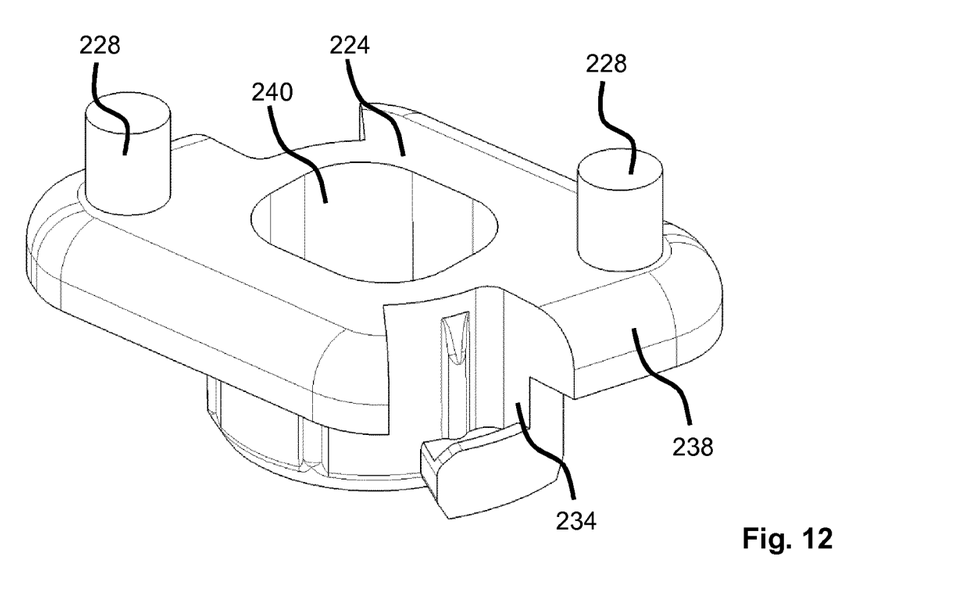
FIG. 12 is a perspective view of a guide sleeve according to the third exemplary embodiment in a state before mounting.

In FIG. 12, a perspective view of the guide sleeve 224 according to the third exemplary embodiment is shown. In this case it may be seen that the securing pins of the anti-twist protection device 228 protrude upwardly from the top portion 238 of the guide sleeve 224 in the unmounted state. Moreover, the guide sleeve 224 comprises a stop 234 which limits a rotatability of the guide sleeve 224 inserted into the opening 222 when the stop 234 comes to bear against the stop edge 236.

Figure 13:
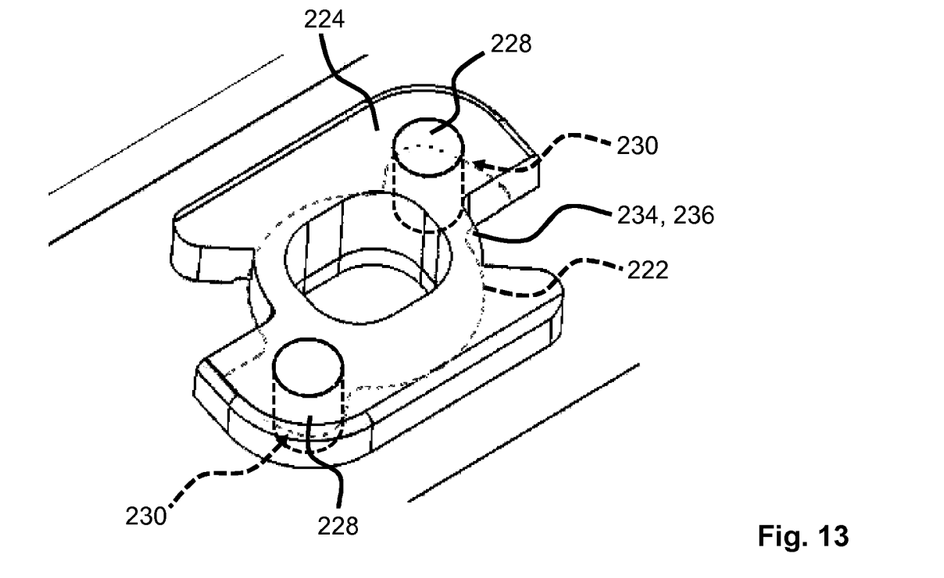
FIG. 13 is a perspective view of the guide sleeve of FIG. 12 in a state after mounting.

FIG. 13 shows the guide sleeve 224 according to the third exemplary embodiment in a state after being mounted in the opening 222. If the guide sleeve 224 inserted into the opening 222 is rotated sufficiently far that the stop 234 and the stop edge 236 come to bear against one another, by a displacement of the securing pins of the anti-twist protection device 228, in particular by pushing the securing pins into the guide sleeve 224, the guide sleeve 224 may be secured against rotation. The securing pins, which in the vertical direction z are movably arranged in the guide sleeve 224, in the present case are inserted into the guide sleeve 224 until the upper edge of the securing pins of the anti-twist protection device 228 terminates flush with the guide sleeve 224. In this case, the securing pins of the anti-twist protection device 228 enter the contour 232 of the opening 222 with their lower end and secure the contact of the stop 234 relative to the stop edge 236.

While specific embodiments of the invention have been shown and described in detail to illustrate the application of the principles of the invention, it will be understood that the invention may be embodied otherwise without departing from such principles.

The invention claimed is:

1. A longitudinal adjuster for a vehicle seat, the longitudinal adjuster comprising:
    at least one pair of rails comprising a lower seat rail and an upper seat rail, wherein the seat rails of the pair of seat rails mutually engage each other and are movable relative to each other in a longitudinal direction;
    a locking device, wherein the seat rails of the pair of seat rails are lockable to each other by the locking device, the locking device comprising:
    at least one latching plate, which is movable in a vertical direction, wherein the latching plate has a guide pin protruding in the vertical direction, wherein the upper seat rail has an opening aligned with the guide pin; and
    a guide sleeve extending into a cavity formed between the seat rails the guide sleeve being accommodated in the opening and the guide pin being guided by the guide sleeve, and the upper seat rail and the guide sleeve being connected by a bayonet catch;
    wherein the guide sleeve has an anti-twist protection device configured to fix the mounted guide sleeve in the opening
    wherein the anti-twist protection device comprises securing pins pushed in the vertical direction into the guide sleeve and engaging in a widening of the opening.

2. The longitudinal adjuster as claimed in claim 1, wherein the guide sleeve is configured to be closed upwardly in the vertical direction.

3. The longitudinal adjuster as claimed in claim 1, wherein the guide sleeve bears from above, with a top portion in a region of the opening, against a surface of the upper seat rail.

4. The longitudinal adjuster as claimed in claim 1, wherein the guide sleeve has an upwardly rounded outer surface.

5. The longitudinal adjuster as claimed in claim 1, wherein the guide sleeve has a conical opening in a lower region.

6. The longitudinal adjuster as claimed in claim 1, wherein the guide sleeve has a stop.

7. The longitudinal adjuster as claimed in claim 1, wherein a contour of the opening has a stop edge.

8. The longitudinal adjuster as claimed in claim 7, wherein the stop edge is arranged in a lateral widening of the opening, wherein the widening outwardly widens a partially round opening cross-section.

9. The longitudinal adjuster as claimed in claim 1, wherein the anti-twist protection device is configured in the form of a clip spring-elastically protruding.

10. The longitudinal adjuster as claimed in claim 1, wherein an internal diameter of the guide sleeve is slightly larger than an external diameter of the guide pin.

11. The longitudinal adjuster as claimed in claim 1, wherein the guide sleeve has at least three guide surfaces on an inner face thereof.

12. The longitudinal adjuster as claimed in claim 1, wherein the guide sleeve is produced from a plastic material.

13. A vehicle seat comprising a longitudinal adjuster the longitudinal adjuster comprising:
    at least one pair of rails comprising a lower seat rail and an upper seat rail, wherein the seat rails of the pair of seat rails mutually engage each other and are movable relative to each other in a longitudinal direction;
    a locking device, wherein the seat rails of the pair of seat rails are lockable to each other by the locking device, the locking device comprising:
    at least one latching plate, which is movable in a vertical direction, wherein the latching plate has a guide pin protruding in the vertical direction, wherein the upper seat rail has an opening aligned with the guide pin;
    a guide sleeve extending into a cavity formed between the seat rails, the guide sleeve being accommodated in the opening and the guide pin being guided by the guide sleeve, and the upper seat rail and the guide sleeve being connected by a bayonet catch;
    wherein the guide sleeve is configured to be closed upwardly in the vertical direction.

14. The vehicle seat as claimed in claim 13, wherein the guide sleeve bears from above, with a top portion in a region of the opening, against a surface of the upper seat rail.

15. The vehicle seat as claimed in claim 13, wherein the guide sleeve has an upwardly rounded outer surface.

16. The vehicle seat as claimed in claim 13, wherein the guide sleeve has a conical opening in a lower region.

17. The vehicle seat as claimed in claim 13, wherein the guide sleeve has an anti-twist protection device configured to fix the mounted guide sleeve in the opening.

* * * * *